United States Patent
Wong

(10) Patent No.: US 10,424,993 B2
(45) Date of Patent: Sep. 24, 2019

(54) VERTICALLY MOUNTED AND MAGNETICALLY DRIVEN POWER GENERATION APPARATUS WITH ENERGY-SAVING EFFECT

(71) Applicant: Shou-Cheng Wong, Kaohsiung (TW)

(72) Inventor: Shou-Cheng Wong, Kaohsiung (TW)

(*) Notice: Subject to any disclaimer, the term of this patent is extended or adjusted under 35 U.S.C. 154(b) by 338 days.

(21) Appl. No.: 15/621,550

(22) Filed: Jun. 13, 2017

(65) Prior Publication Data

US 2018/0069452 A1    Mar. 8, 2018

(30) Foreign Application Priority Data

Sep. 7, 2016    (TW) .............................. 105128861 A

(51) Int. Cl.
| | | |
|---|---|---|
| *H02K 7/09* | (2006.01) | |
| *H02K 47/00* | (2006.01) | |
| *H02K 1/27* | (2006.01) | |

(52) U.S. Cl.
CPC ............. *H02K 7/09* (2013.01); *H02K 1/2793* (2013.01); *H02K 47/00* (2013.01)

(58) Field of Classification Search
CPC ........ H02K 47/00; H02K 47/04; H02K 47/14; H02K 47/20; H02K 7/02; H02K 7/09;
(Continued)

(56) References Cited

U.S. PATENT DOCUMENTS 4,320,927 A * 3/1982 Sertich ..................... A61C 1/05
310/90.5
4,340,260 A * 7/1982 Forster ................ F16C 32/0429
310/90.5
(Continued)

FOREIGN PATENT DOCUMENTS

| CN | 201818757 | 5/2011 |
|---|---|---|
| CN | 103195671 | 7/2013 |

(Continued)

OTHER PUBLICATIONS

Search report for TW105128861, dated Apr. 27, 2017, total of 3 pages.

(Continued)

*Primary Examiner* — Jeremy A Luks

(74) *Attorney, Agent, or Firm* — Ruth Lynette Wylie; Apex Juris, pllc.

(57) ABSTRACT

A vertically mounted and magnetically driven power generation apparatus has multiple shelves vertically arranged and spaced apart. Each shelf has a through hole tapering downwards. A spindle is mounted through the multiple through holes. A motor driving the spindle and a primary power generator driven by the spindle and located below the motor are mounted around the spindle. Because of the weight of the primary power generator, adding additional weight is not need. A magnetic driven member is mounted around the spindle and located within a corresponding through hole. Multiple magnetic drive assemblies are mounted in inner walls of the multiple through holes. Each magnetic driven member is subject to forces of magnetic repulsion caused by first and second magnetic drive members of a corresponding magnetic drive assembly for the spindle to be rotated under a friction-free condition to enhance torque and rotation speed of the spindle.

16 Claims, 11 Drawing Sheets

(58) Field of Classification Search
CPC .............. F16C 32/0408; F16C 32/0412; F16C 32/0436; F16C 32/0429; F16C 32/0491
USPC .................................. 310/74, 90.5, 112–113
See application file for complete search history.

(56) References Cited

U.S. PATENT DOCUMENTS

| | | | | |
|---|---|---|---|---|
| 4,688,998 | A * | 8/1987 | Olsen | F04D 1/006 |
| | | | | 415/900 |
| 4,956,571 | A * | 9/1990 | Gordon | F16C 32/0438 |
| | | | | 310/10 |
| 5,010,722 | A * | 4/1991 | Yamaguchi | D01H 7/56 |
| | | | | 57/124 |
| 5,321,329 | A * | 6/1994 | Hovorka | F16C 39/063 |
| | | | | 310/90.5 |
| 6,015,272 | A * | 1/2000 | Antaki | F04D 3/02 |
| | | | | 415/900 |
| 6,124,658 | A * | 9/2000 | Coenen | D01H 4/12 |
| | | | | 310/90 |
| 6,359,357 | B1 * | 3/2002 | Blumenstock | F16C 32/0465 |
| | | | | 310/90.5 |
| 7,462,950 | B2 * | 12/2008 | Hu | F16C 39/066 |
| | | | | 290/44 |
| 8,053,940 | B2 * | 11/2011 | McCulley | H02K 53/00 |
| | | | | 310/113 |
| 8,487,470 | B2 | 7/2013 | Grassman | |
| 10,305,348 | B2 * | 5/2019 | Wong | H02K 7/09 |
| 2001/0036565 | A1 * | 11/2001 | Jennings | F16C 32/0493 |
| | | | | 429/10 |
| 2003/0197439 | A1 * | 10/2003 | Kuipers | F16C 39/063 |
| | | | | 310/90.5 |
| 2005/0264118 | A1 * | 12/2005 | Kascak | F16C 32/0493 |
| | | | | 310/90.5 |
| 2012/0187922 | A1 * | 7/2012 | Dubois | F16F 15/305 |
| | | | | 322/4 |
| 2018/0069452 | A1 * | 3/2018 | Wong | H02K 1/2793 |
| 2018/0115233 | A1 * | 4/2018 | Wong | F16C 32/0408 |
| 2018/0351446 | A1 * | 12/2018 | Wong | H02K 53/00 |

FOREIGN PATENT DOCUMENTS

| | | |
|---|---|---|
| CN | 203872032 | 12/2014 |
| TW | 201310871 | 3/2013 |
| TW | M483321 | 8/2014 |
| TW | M536436 | 2/2017 |

OTHER PUBLICATIONS

English abstracts for TWM536436, TW201310871, TWM483321, CN203872032, CN103195671, CN201818757, Total of 4 pages.

* cited by examiner

VERTICALLY MOUNTED AND MAGNETICALLY DRIVEN POWER GENERATION APPARATUS WITH ENERGY-SAVING EFFECT

BACKGROUND OF THE INVENTION

1. Field of the Invention

The present invention relates to a power generation apparatus and, more particularly, to a vertically mounted and magnetically driven power generation apparatus with energy-saving effect.

2. Description of the Related Art

A conventional transmission assembly includes a transmission mechanism and a shaft support for the transmission mechanism to be rotatably mounted through the shaft support. To reduce friction between the shaft support and the transmission mechanism, a bearing is mounted between the shaft support and the transmission mechanism with bearing lubricant added therein for lubrication. Despite the bearing and the bearing lubricant, the issues of friction and energy loss among parts of the transmission assembly still exist. As a result, in the case of a rotational power source and a rotational power receiving end connected with the transmission assembly, energy fails to be effectively utilized.

Moreover, as the foregoing transmission assembly is a critical assembly in the conventional power generation apparatus, when kinematic energy provided by a rotational power source is transmitted to a power-generating assembly of a power generation apparatus, the kinematic energy is consumed because of friction among parts in the transmission assembly and the direct impact is that the kinematic energy fails to be effectively converted into electrical energy, and this explains why the conventional power generation apparatus is known to have the issue of unsatisfactory power-generating performance.

SUMMARY OF THE INVENTION

An objective of the present invention is to provide a vertically mounted and magnetically driven power generation apparatus with weight-free and energy-saving effect, targeting at resolving the issue of energy loss and ineffective power generation performance caused by transmission mechanism of the conventional power generation apparatus.

To achieve the foregoing objective, the vertically mounted and magnetically driven power generation apparatus with energy-saving effect includes a magnetically driven transmission assembly, multiple magnetic drive assemblies, a weight, a power generator and a motor.

The magnetically driven transmission assembly has a support frame and a transmission mechanism.

The support frame has multiple shelves and multiple struts.

The multiple shelves are vertically arranged and vertically spaced apart from each other. Each shelf has a through hole formed through the shelf and tapering downwards.

The multiple struts are securely connected with the multiple shelves.

The center axis vertically and centrally passes through the support frame and the through holes of the multiple shelves.

The transmission mechanism has a spindle and multiple magnetic driven members.

The spindle is vertically mounted through the support frame along the center axis.

The multiple magnetic driven members are securely mounted around the spindle and are located within the through holes of the respective shelves. Each magnetic driven member is a permanent magnet and has an upper driven portion, a lower driven portion and a ridge line.

The upper driven portion is a truncated cone tapering upwards. The top of the upper driven portion extends beyond a top surface of a corresponding shelf through a top opening of the through hole of the corresponding shelf.

The lower driven portion with a top connected with a bottom of the upper driven portion, is a truncated cone tapering downwards, has a shape symmetrical to that of the upper driven portion, has a magnetic pole different from that of the upper driven portion, and is mounted inside the through hole of the corresponding shelf.

The ridge line is formed on a junction between the upper driven portion and the lower driven portion and takes the form of a circle.

The multiple magnetic drive assemblies are mounted in inner walls of the through holes of the respective shelves. Each magnetic drive assembly has a first magnetic drive member and a second magnetic drive member.

The first magnetic drive member is mounted in the inner wall of the through hole of a corresponding shelf.

The second magnetic drive member has a top connected with a bottom of the first magnetic drive member, and is mounted in the inner wall of the through hole of the corresponding shelf. The first magnetic drive member and the second magnetic drive member are adjacent to but have no contact with the lower driven portion of a corresponding magnetic driven member by way of mutual magnetic repulsion for the transmission mechanism to be vertically and suspendedly mounted through the support frame and the multiple magnetic drive assemblies.

The weight is securely mounted to a bottom end of the spindle of the transmission mechanism.

The power generator has an upper rotating member, multiple upper permanent magnets, a lower rotating member, multiple lower permanent magnets, a middle rotating member, multiple middle permanent magnets, a first fixing board, multiple first windings, a second fixing board, and multiple second windings.

The upper rotating member is securely mounted around the spindle.

The multiple upper permanent magnets are mounted in a bottom surface of the upper rotating member and are distributed in rows aligned in multiple radial directions on the upper rotating member. Bottom surfaces of the multiple upper permanent magnets are flush with the bottom surface of the upper rotating member.

The lower rotating member is securely mounted around the spindle.

The multiple lower permanent magnets are mounted in a top surface of the lower rotating member and are distributed in rows aligned in multiple radial directions on the lower rotating member. Top surfaces of the multiple lower permanent magnets are flush with the top surface of the lower rotating member.

The middle rotating member is securely mounted around the spindle and is located between the upper rotating member and the lower rotating member.

The multiple middle permanent magnets are mounted in a top surface and a bottom surface of the middle rotating member.

The first fixing board is securely mounted to the multiple struts, is located between the upper rotating member and the middle rotating member, and has multiple first slots formed through the first fixing board, aligned radially, and progressively increasing in width in a radial and outward direction of the first fixing board.

The multiple first windings are mounted inside the respective first slots of the first fixing board.

The second fixing board is securely mounted to the multiple struts, is located between the lower rotating member and the middle rotating member, and has multiple second slots formed through the second fixing board, aligned radially, and progressively increasing in width in a radial and outward direction of the second fixing board.

The multiple second windings are mounted inside the respective second slots of the second fixing board.

The motor is mounted around the spindle, is separated from the power generator, and has a stator and a rotor.

The stator is securely mounted to the multiple struts.

The rotor is mounted around the spindle and is located within the stator.

According to the structure of the power generation apparatus, by virtue of forces of magnetic repulsion between the transmission mechanism and the multiple drive assemblies, the transmission mechanism can be stably, vertically and rotatably mounted through the support frame for the spindle to be rotated around the center axis through the support frame. While the spindle and the weight mounted to a bottom end of the spindle are driven and rotated by the motor, the rotational kinematic energy is converted into electrical energy for storage. The motor stops outputting rotational kinematic energy until the spindle and the weight are rotated at a specific rotational speed. Meanwhile, the spindle and the weight can be still rotated by rotational inertia. Because there is no friction upon rotation of the spindle, the torque and rotation speed of the spindle can be enhanced during the course of rotation.

In view of the effect of magnetic repulsion between the transmission mechanism and the multiple magnetic drive assemblies, there is no frictional resistance when the spindle is rotated, such that energy loss can be reduced under the friction-free condition. Additionally, the weight can be rotated along with the spindle to achieve the objective of energy-saving power generation.

Other objectives, advantages and novel features of the invention will become more apparent from the following detailed description when taken in conjunction with the accompanying drawings.

DETAILED DESCRIPTION OF THE INVENTION

Figure 1:
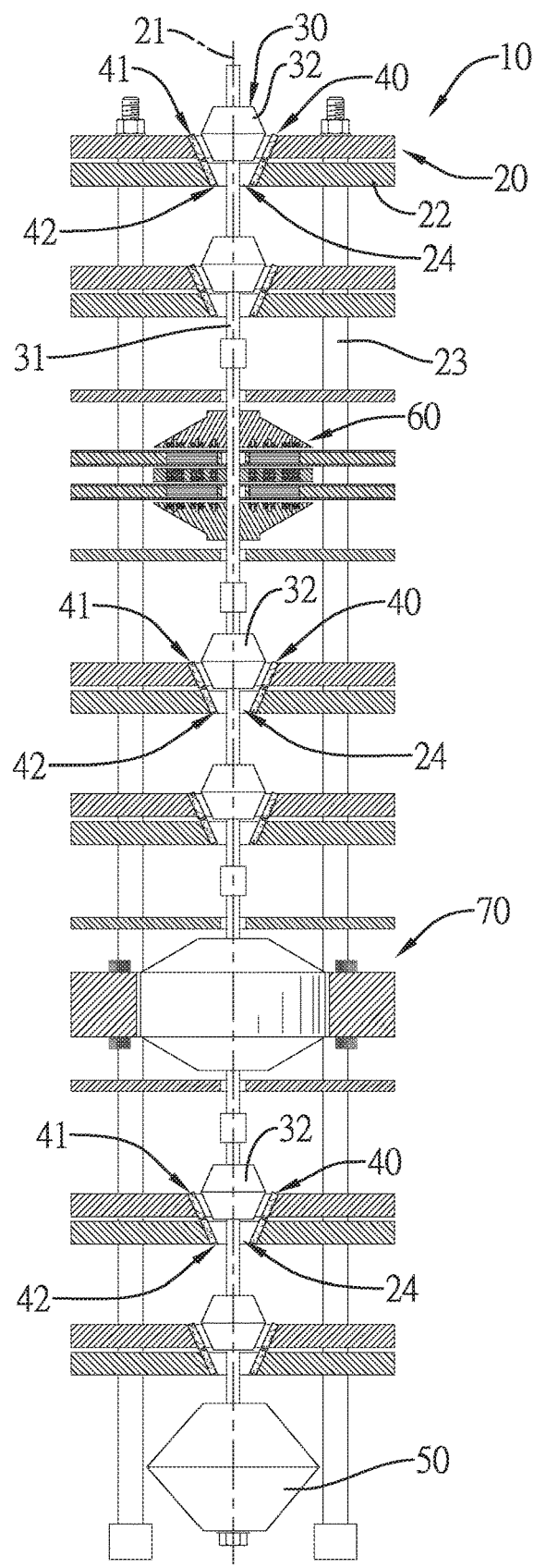
FIG. 1 is a cross-sectional view of an embodiment of a power generation apparatus in accordance with the present invention.

With reference to FIG. 1, a power generation apparatus 10 in accordance with the present invention includes a support frame 20, a transmission mechanism 30, multiple magnetic drive assemblies 40, a weight 50, a power generator 60 and a motor 70. The motor 70 and the power generator 60 may be mounted inside a housing.

With reference to FIGS. 1 to 4, the support frame 20 includes multiple shelves 22 and multiple struts 23. The multiple shelves 22 are vertically arranged and are vertically spaced apart from each other. The multiple struts 23 are securely connected with the multiple shelves 22 to support the multiple shelves 22. Each shelf 22 may be formed by a single board or multiple boards stacked to each other. The support frame 20 has a center axis 21 vertically and centrally passing through the support frame 20. Each shelf 22 has a through hole 24 that is formed through the shelf 22 and tapers downwards and may be a truncated conic via hole or a truncated pyramid-like via hole.

Figure 4:
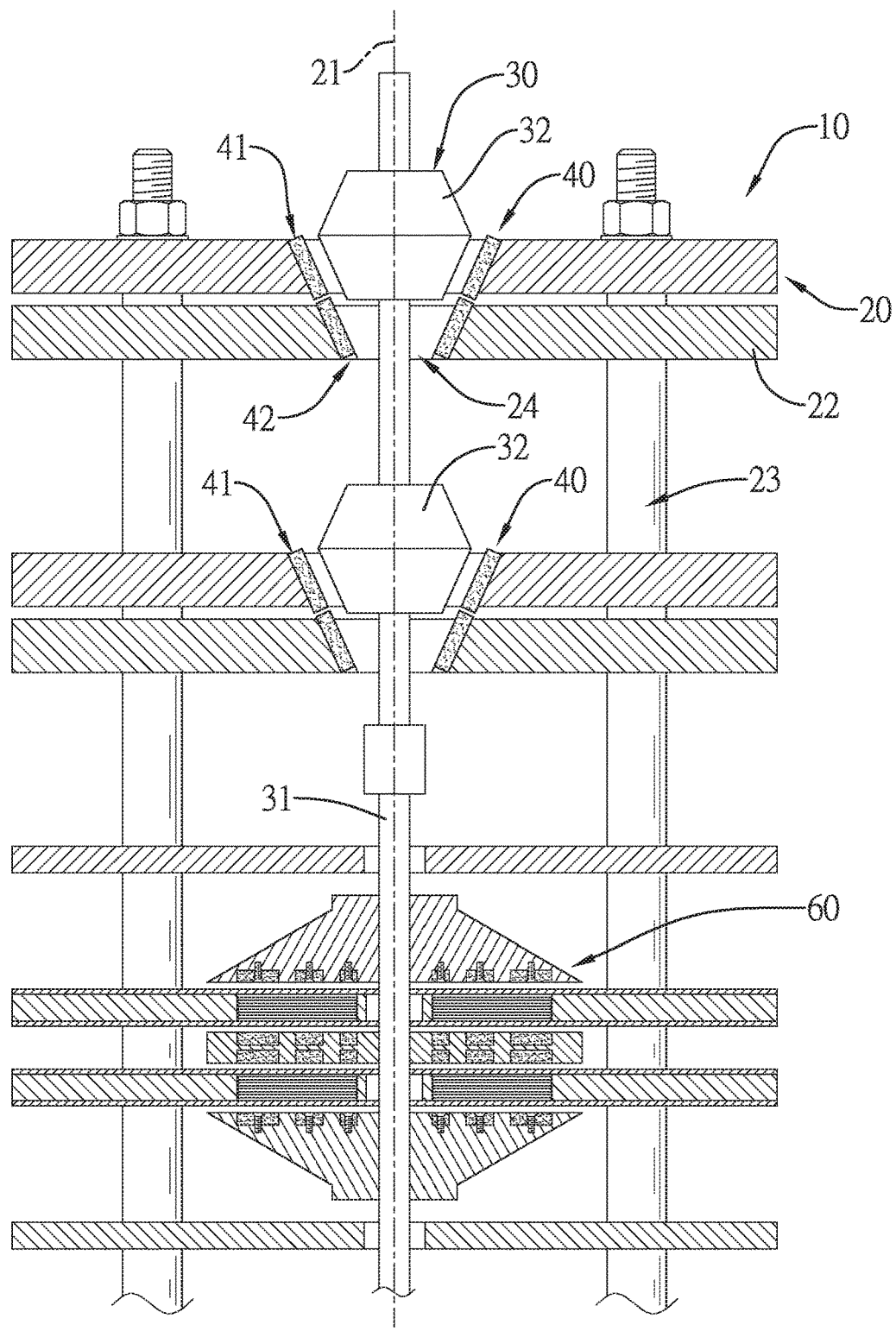
FIG. 4 is enlarged cross-sectional view showing the support frame, the transmission mechanism, the magnetic drive assembly and a power generator of the power generation apparatus in FIG. 1.

With reference to FIGS. 1 and 4, the transmission mechanism 30 is vertically mounted through the support frame 20 and includes a spindle 31 and multiple magnetic driven members 32. The spindle 31 may take the form of a single shaft or multiple shafts sequentially connected to each other, and is vertically mounted through the support frame 20 along the center axis 21. The multiple magnetic driven members 32 are securely mounted around the spindle 31 and are located within the through holes 24 of the respective shelves 22. In other words, each magnetic driven member 32 corresponds to the through hole 24 of a respective one of the multiple shelves 22.

With further reference to FIGS. 1 and 4, there are six magnetic driven members 32, and two of the six multiple magnetic driven members 32, the power generator 60, another two of the six magnetic driven members 32, the motor 70, the remaining two magnetic driven members 32, and the weight 50 are sequentially mounted around the spindle 31 in a downward direction and are spaced apart from each other. It is stressed that the number of the magnetic driven members 32 may be a number other than six as illustrated in FIG. 1.

Figure 2:
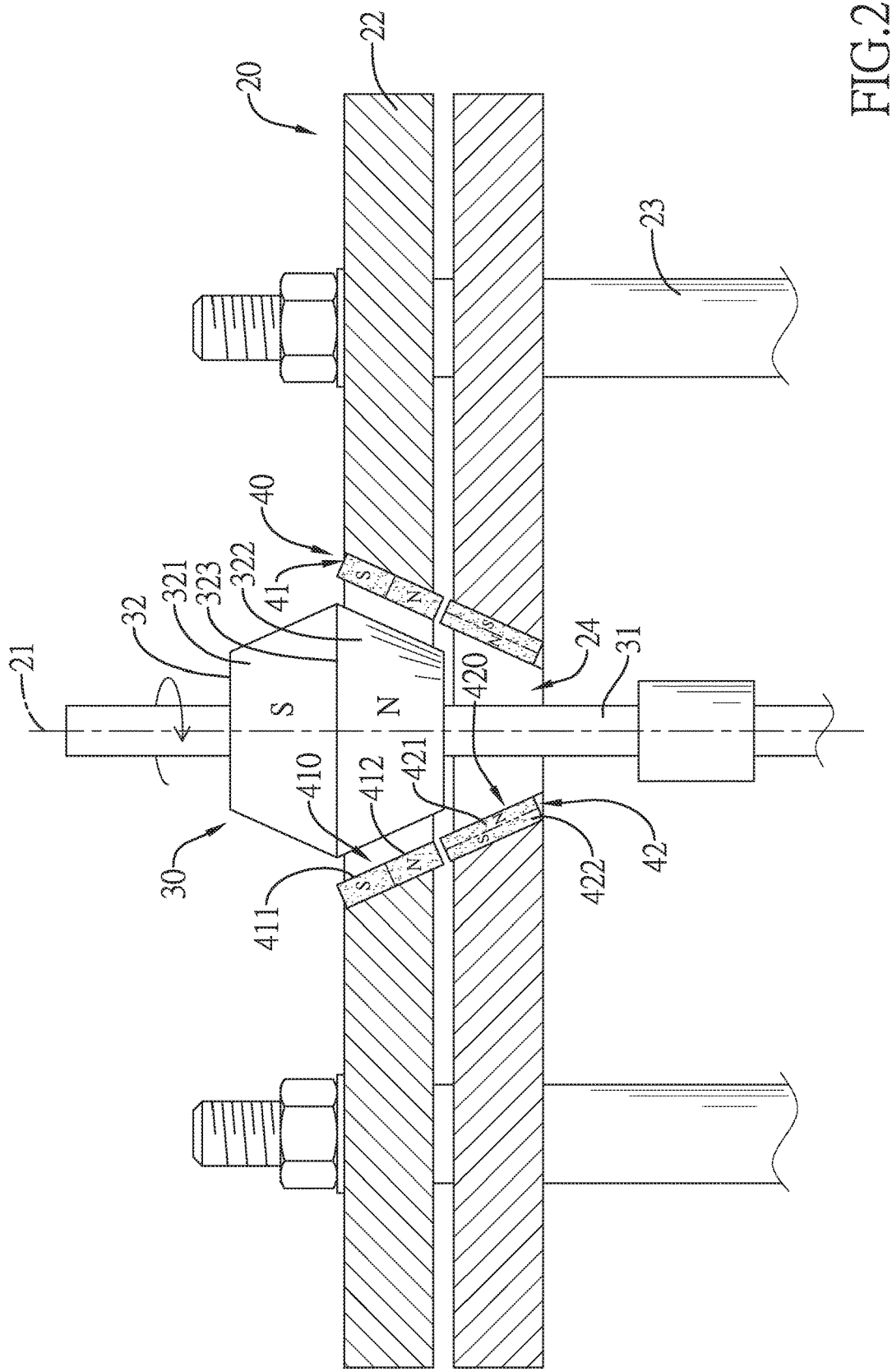
FIG. 2 is an enlarged cross-sectional view showing a support frame, a transmission mechanism and a magnetic drive assembly of the power generation apparatus in FIG. 1.

The magnetic driven members 32 may be permanent magnets. With further reference to FIG. 2, each magnetic driven member 32 has an upper driven portion 321 and a lower driven portion 322. A top of the lower driven portion 322 is connected with a bottom of the upper driven portion 321. The lower driven portion 322 may be a truncated cone or a truncated pyramid tapering downwards. The upper driven portion 321 may be a truncated cone or a truncated pyramid tapering upwards. The shapes of the upper driven portion 321 and the lower driven portion 322 are symmetrical. A ridge line 323 is formed on a junction between the upper driven portion 321 and the lower driven portion 322 and takes the form of a circle or all sides of a regular polygon. Given the upper driven portion 321 and the lower driven portion 322 taking the form of a cone and the ridge line 323 taking the form of a circular line as an example, the diameter of the magnetic driven member 32 is largest at the ridge line 323 and the diameters of the magnetic driven member 32 at a truncated top surface and at a truncated bottom surface are equal and are smaller than the diameter at the ridge line 323. The upper driven portion 321 and the lower driven portion 322 have different magnetic poles. For example, when the upper driven portion 321 has the magnetic south pole S, the lower driven portion 322 has the magnetic north pole N. The lower driven portion 322 of each magnetic driven member 32 is mounted inside the through hole 24 of a corresponding shelf 22, and a top of the upper driven portion 321 of the magnetic driven member 32 extends beyond a top surface of the corresponding shelf 22 through a top opening of the through hole 24.

An included angle between the center axis 21 and each of a peripheral surface of the lower driven portion 322 and a peripheral surface of the upper driven portion 321 is in a range of 15° to 75°. Preferably, the included angle associated with each of the upper driven portion 321 and the lower driven portion 322 is 30°, 45° or 60°.

Figure 3:
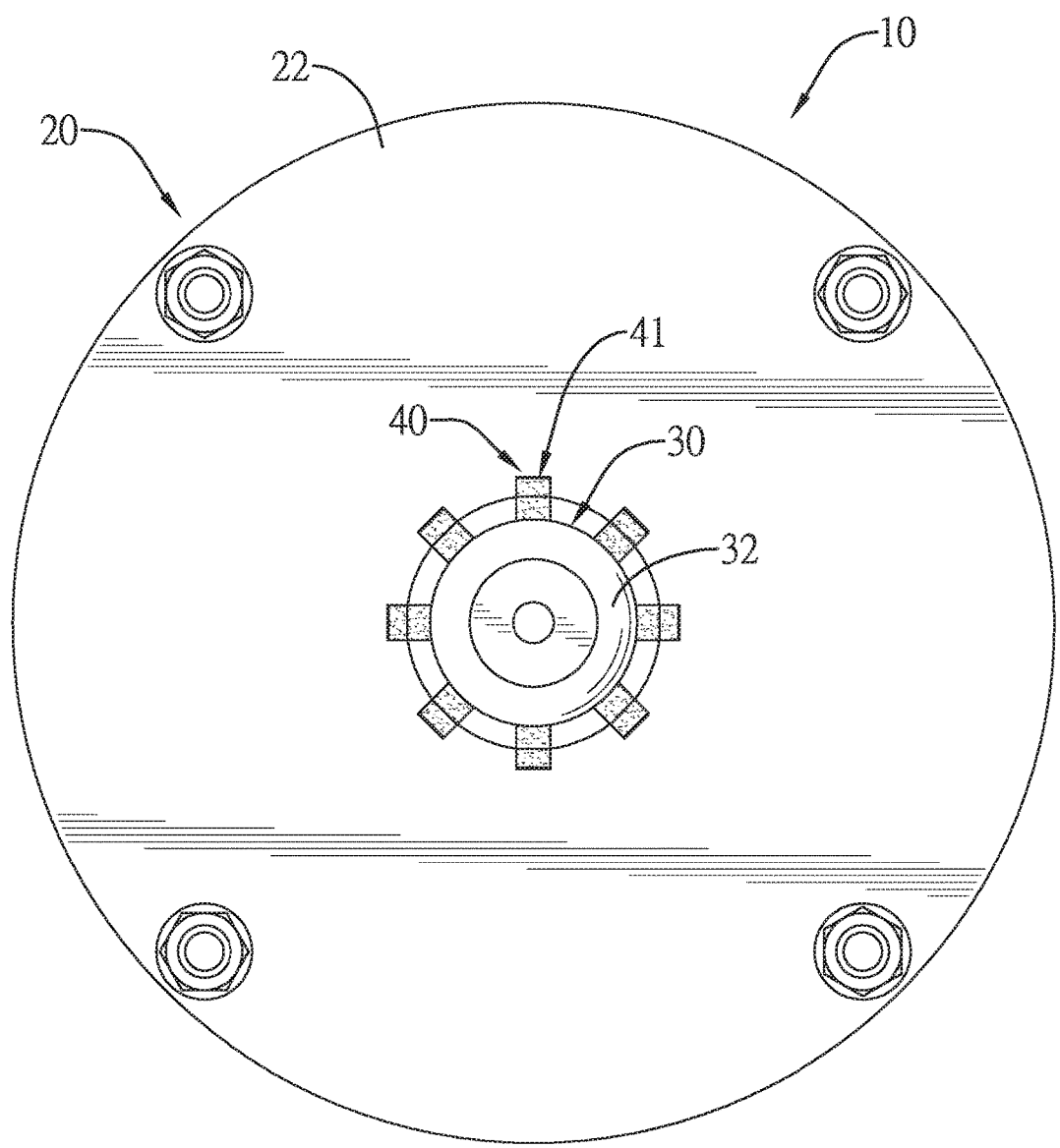
FIG. 3 is a top view of the power generation apparatus in FIG. 1.

With reference to FIGS. 1 to 3, the multiple magnetic drive assemblies 40 are mounted in inner walls of the through holes 24 of the respective shelves 22. The number of the multiple magnetic drive assemblies 40 corresponds to that of the multiple magnetic driven members 32. Each magnetic drive assembly 40 includes a first magnetic drive member 41 and a second magnetic drive member 42 mounted in the inner wall of the through hole 24 of a corresponding shelf 22 with a bottom of the first magnetic drive member 41 adjacent to a top of the second magnetic drive member 42. In other words, the first magnetic drive member 41 is located in an upper portion of the through hole 24, and the second magnetic drive member 42 is located in a lower portion of the through hole 24. The first magnetic drive member 41 and the second magnetic drive member 42 are adjacent to but have no contact with the lower driven portion 322 of a corresponding magnetic driven member 32 by way of mutual magnetic repulsion. Inner surfaces of the first magnetic drive member 41 and the second magnetic drive member 42 facing the lower driven portion 322 of the corresponding magnetic driven member are parallel to the peripheral surface of the lower driven portion 322. A gap exists between the lower driven portion 322 and each of the first magnetic drive member 41 and the second magnetic drive member 42 of a corresponding magnetic drive assembly 40. The weight of the transmission mechanism 30 is offset by the magnetic repulsion occurring between the multiple magnetic drive assemblies 40 and the multiple magnetic driven members 32 on the transmission mechanism 30, such that the transmission mechanism 30 can be vertically and suspendedly mounted through the support frame 20 and the transmission mechanism 30 is rotatable around the center axis 21. By virtue of the first magnetic drive member 41 and the second magnetic drive member 42 of each magnetic drive assembly 40 and a force of magnetic attraction generated between the first magnetic drive member 41 and a corresponding magnetic driven member 32 and a force of magnetic repulsion respectively generated between the second magnetic drive member 42 and the corresponding magnetic driven member 32, the transmission mechanism 30 can be vertically and stably rotated around the center axis 21.

Figure 5:
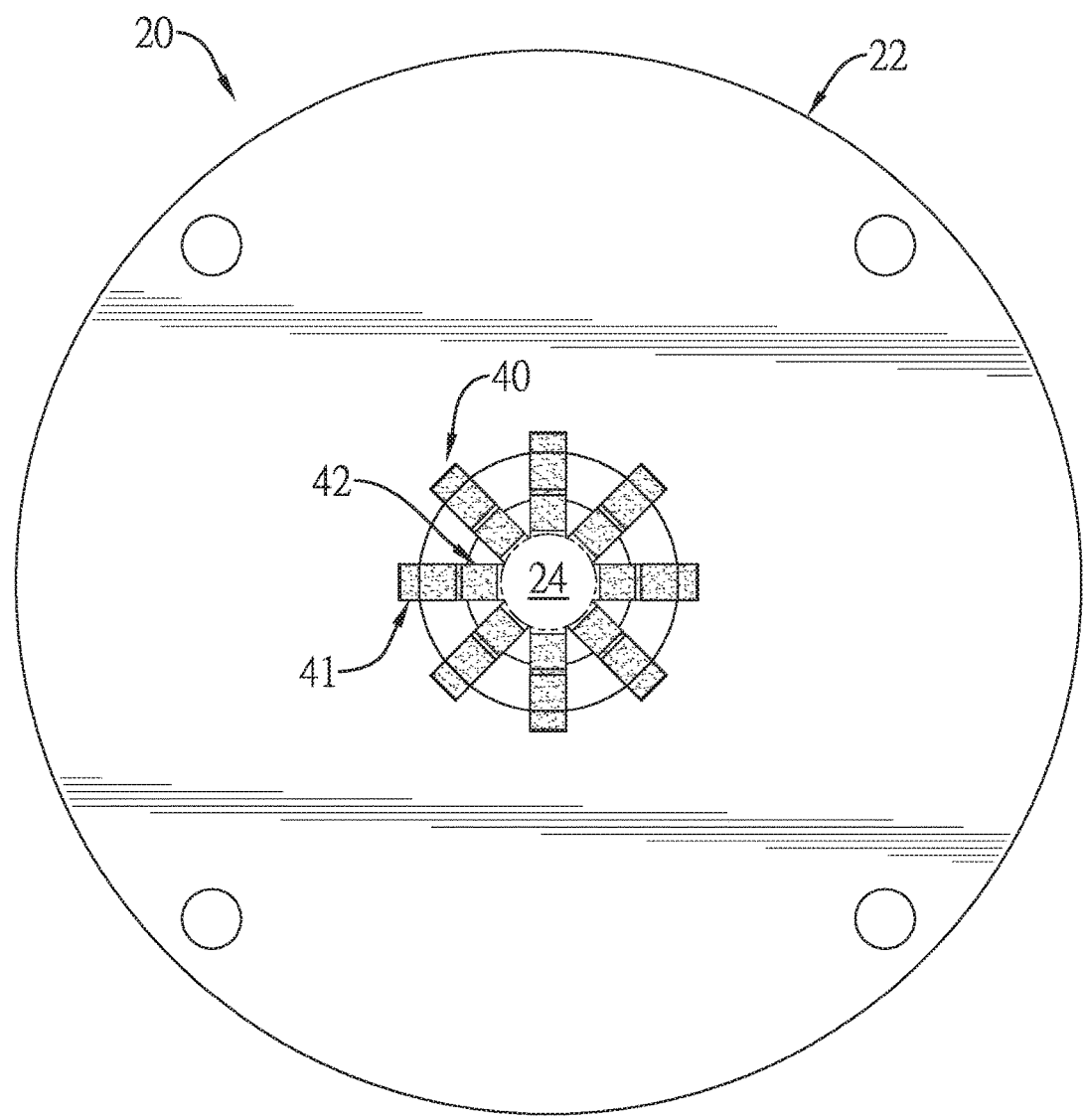
FIG. 5 is a top view showing an embodiment of the support frame and multiple magnetic drive assemblies of the power generation apparatus in FIG. 1.
Figure 6:
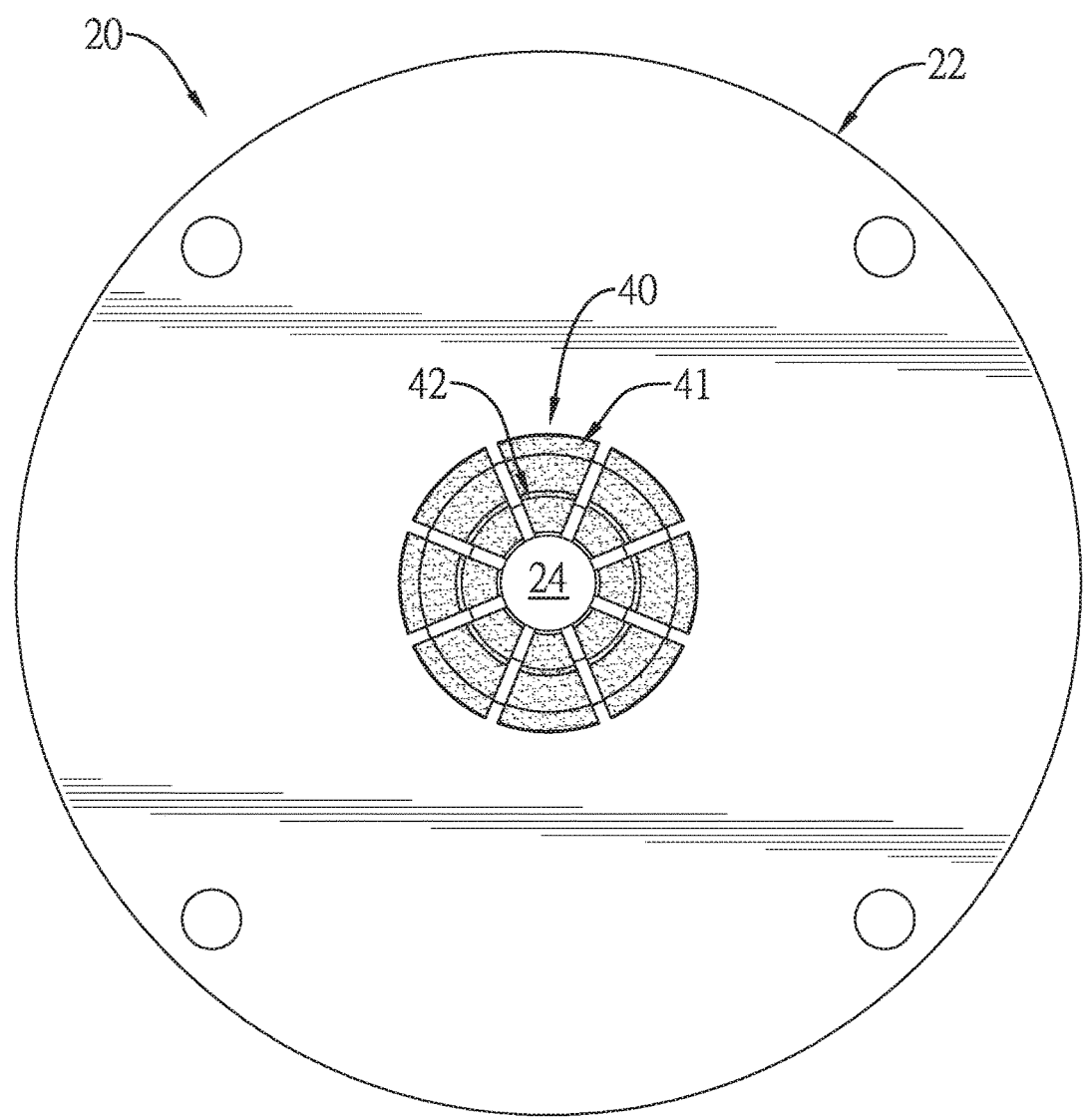
FIG. 6 is a top view showing another embodiment of the support frame and multiple magnetic drive assemblies of the power generation apparatus in FIG. 1.

With reference to FIGS. 2 and 3, each first magnetic drive member 41 has multiple first permanent magnets 410 annularly mounted around the inner wall of the through hole 24 of a corresponding shelf 22 and spaced apart from each other. Each first permanent magnet 410 takes the form of a straight bar as shown in FIG. 5 or takes the form of a truncated sector plate as shown in FIG. 6. The inner surface of each first permanent magnet 410 facing a corresponding magnetic driven member 32 may be a flat surface or a curved surface and is parallel to the peripheral surface of the lower driven portion 322 of the corresponding magnetic driven member 32. An outer periphery of the first permanent magnet 410 is mounted in an upper portion of the inner wall of a corresponding through hole 24. An included angle between the inner surface of the first magnetic drive member 41 facing the corresponding magnetic driven member 32 and the center axis 21 is in a range of 15° to 75°, and 30°, 45° or 60° is preferable.

With reference to FIG. 2, each first permanent magnet 410 includes an upper pole portion 411 and a lower pole portion 412. The upper pole portion 411 and the lower pole portion 412 are integrally formed and annularly mounted in the inner surface of the through hole 24 to face a corresponding magnetic driven member 32. The upper pole portion 411 and the lower pole portion 412 are spaced apart from the lower driven portion 322 of the corresponding magnetic driven member 32 by a gap. The upper pole portion 411 and the lower driven portion 322 of the corresponding magnetic driven member 32 have different magnetic poles. The lower pole portion 412 and the lower driven portion 322 of the corresponding magnetic driven member 32 have identical magnetic poles. Thus, the upper pole portion 411 and the lower pole portion 412 provide a force of magnetic attraction and a force of magnetic repulsion relative to the lower driven portion 322 of the corresponding magnetic driven member 32. In other words, when the upper driven portion 321 and the lower driven portion 322 of the corresponding magnetic driven member 32 are the magnetic south pole S and the magnetic north pole N respectively, the upper pole portion 411 and the lower pole portion 412 are the magnetic south pole S and the magnetic north pole N respectively.

With reference to FIGS. 1 to 3, each second magnetic drive member 42 has multiple second permanent magnets 420 annularly mounted in the inner wall of the through hole 24 of a corresponding shelf 22 and spaced apart from each other. Each second permanent magnet 420 may take the form of a straight bar as shown in FIG. 5 or a truncated sector plate as shown in FIG. 6. The inner surface of each second permanent magnet 420 facing a corresponding magnetic driven member 32 may be a flat surface or a curved surface and is parallel to the peripheral surface of the lower driven portion 322 of the corresponding magnetic driven member 32. An outer periphery of the second permanent magnet 420 is mounted in the upper portion of the inner wall of a corresponding through hole 24. An included angle between the surface of each second permanent magnet 420 and the center axis 21 is in a range of 15° to 75° and is 30°, 45° or 60° preferably.

With further reference to FIG. 2, each second permanent magnet 420 has an inner pole portion 421 proximate to the center axis 21 and an outer pole portion 422 distal to the center axis 21. The inner pole portion 421 and the outer pole portion 422 are integrally formed and are spaced apart from the lower driven portion 322 of a corresponding magnetic driven member 32 by a gap. The inner pole portion 421 and the lower driven portion 322 of the corresponding magnetic driven member 32 have an identical magnetic pole, such that a force of magnetic repulsion is provided to the lower driven portion 322 of the corresponding magnetic driven member 32. Supposing that the upper driven portion 321 and the lower driven portion 322 of the corresponding magnetic driven member 32 are the magnetic south pole S and the magnetic north pole N respectively and the upper pole portion 411 and the lower pole portion 412 of the second permanent magnet 420 have the magnetic south pole S and the magnetic north pole N respectively, the inner pole portion 421 and the outer pole portion 422 have the magnetic north pole N and the magnetic south pole S.

With reference to FIG. 1, the weight 50 is securely mounted around a bottom end of the spindle 31 of the transmission mechanism 30 with the center of gravity of the weight 50 located on the center axis 21, and has an upper portion and a lower portion. The upper portion may be a truncated cone or a truncated pyramid tapering upwards. The lower portion may be a truncated cone or a truncated pyramid tapering downwards. The shapes of the upper portion and the lower portion of the weight 50 are symmetrical. A ridge line is formed on a junction between the upper portion and the lower portion of the weight 50 and takes the form of a circle or all sides of a regular polygon. Given the upper portion and the lower portion of the weight 50 taking the form of a cone and the ridge line of the weight 50 taking the form of a circle as an example, the diameter of the weight 50 is largest at the ridge line of the weight 50.

Figure 7:
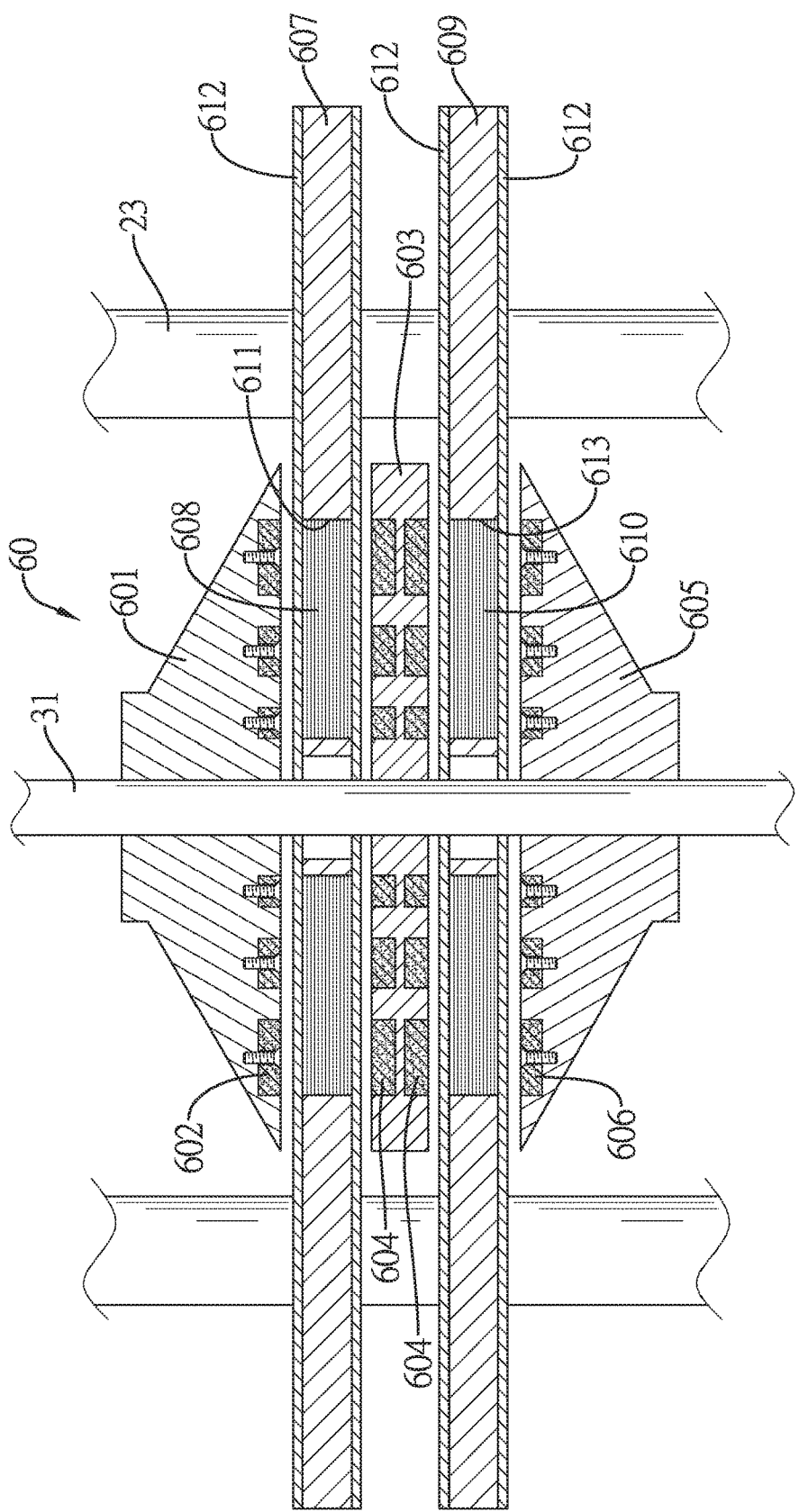
FIG. 7 is a cross-sectional view of a power generator of the power generation apparatus in FIG. 1.

With reference to FIGS. 1 and 7, the power generator 60 is capable of converting rotational kinematic energy into electrical energy and includes an upper rotating member 601, multiple upper permanent magnets 602, a middle rotating member 603, multiple middle permanent magnets 604, a lower rotating member 605, multiple lower permanent magnets 606, a first fixing board 607, multiple first windings 608, a second fixing board 609, and multiple second windings 610.

Figure 8:
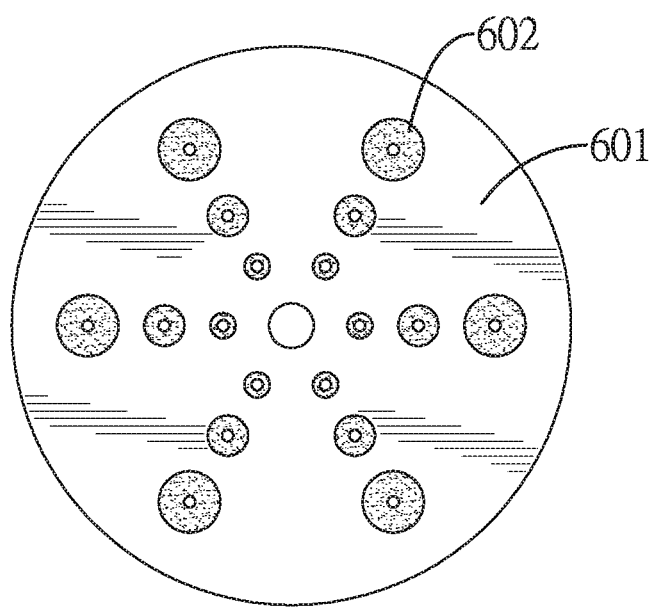
FIG. 8 is a top view of an upper rotating member and upper permanent magnets in the upper rotating member of the power generator in FIG. 7.

The upper rotating member 601, the middle rotating member 603 and the lower rotating member 605 are made of plastic steel, are vertically spaced apart from each other, and are securely mounted around the spindle 31. The upper rotating member 601, the middle rotating member 603 and the lower rotating member 605 are rotated along with the spindle 31 to rotate around the center axis 21. With reference to FIGS. 7 and 8, the upper rotating member 601 of the power generator 60 takes the form of a truncated cone, an included angle between a peripheral surface and a bottom surface of the upper rotating member 601 is 30°, the lower rotating member 605 of the power generator 60 takes the form of a truncated cone, an included angle between a peripheral surface and a top surface of the lower rotating member 601 is 30°.

The upper rotating member 601 has multiple recesses formed in the bottom surface of the upper rotating member 601 and distributed in rows aligned in multiple radial directions. The multiple upper permanent magnets 602 are mounted inside the respective recesses of the upper rotating member 601. With reference to FIG. 8, illustration of distribution of the multiple upper permanent magnets 602 mounted in the bottom surface of the upper rotating member 601 is shown. Bottom surfaces of the multiple upper permanent magnets 602 are flush with the bottom surface of the upper rotating member 601. The multiple upper permanent magnets 602 are fastened inside the respective recesses of the upper rotating member 601 by bolts and may be cylindrical magnets. The diameters of the upper permanent magnets 602 in each row of the multiple upper permanent magnets 602 progressively increase in a radial direction from a center to a rim of the upper rotating member 601.

The multiple lower permanent magnets 606 are mounted in a top surface of the lower rotating member 605 and are identical to the multiple upper permanent magnets 602 in terms of shape and distribution of magnets, so that similar description is not repeated here. In brief, the multiple lower permanent magnets 606 are distributed in rows aligned in multiple radial directions on the top surface of the lower rotating member 605, top surfaces of the multiple lower permanent magnets 606 are flush with the top surface of the lower rotating member 605, and the diameters of the lower permanent magnets 606 in each row of the multiple lower permanent magnets 606 progressively increase in a radial direction from a center to a rim of the lower rotating member 605.

Figure 9:
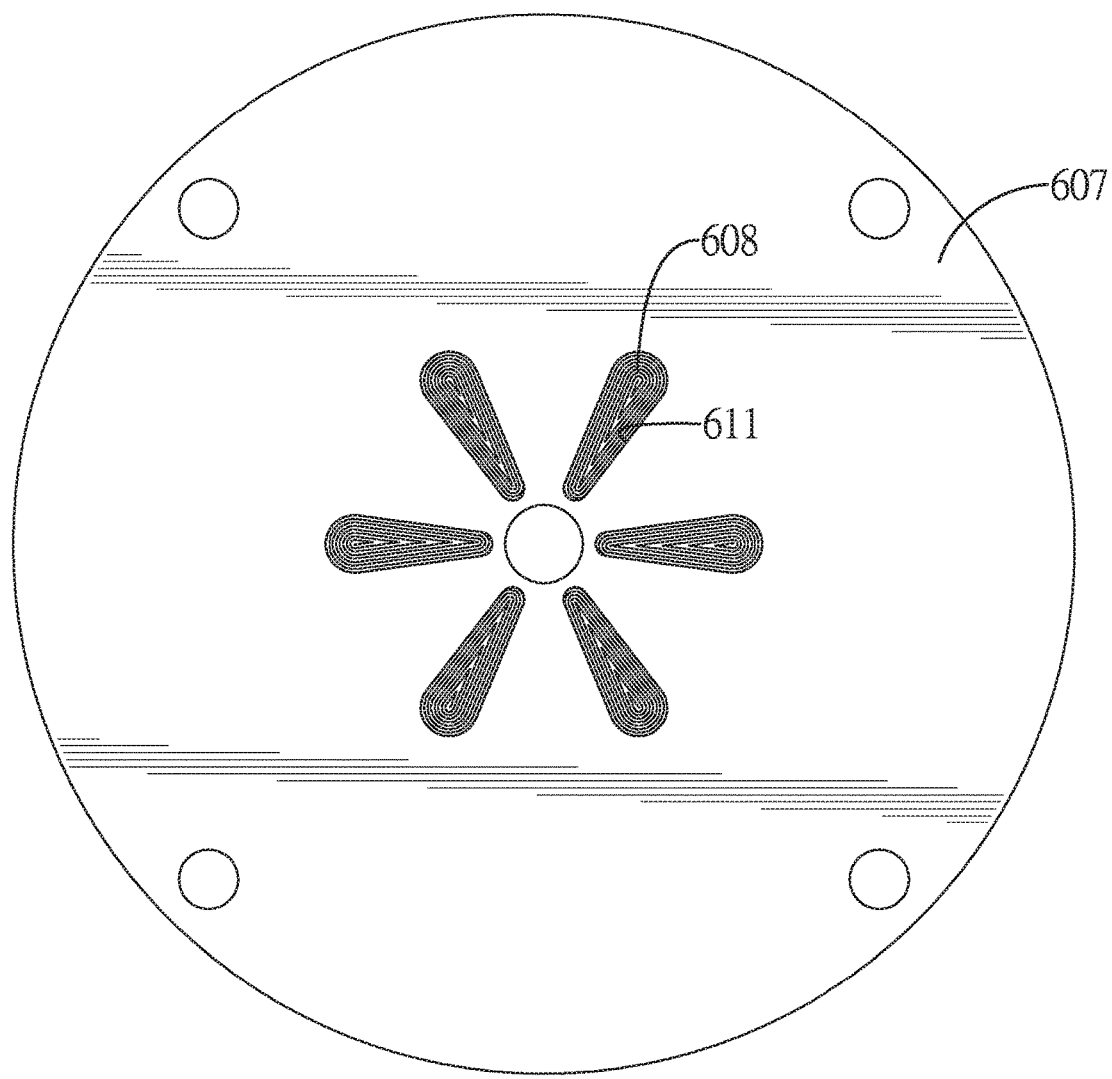
FIG. 9 is a top view of a first fixing board and first windings of the power generator in FIG. 7.

With reference to FIGS. 7 and 9, the middle rotating member 603 is located between the upper rotating member 601 and the lower rotating member 605, the multiple middle permanent magnets 604 are mounted in a top surface and a bottom surface of the middle rotating member 603. Each of the top surface and the bottom surface of the middle rotating member 603 has multiple recesses formed therein. The multiple middle permanent magnets 604 are respectively mounted inside the recesses on the top surface and the bottom surface of the middle rotating member 603. Top surfaces of the middle permanent magnets 604 are flush with the top surface of the middle rotating member 603. Bottom surfaces of the middle permanent magnets 604 are flush with the bottom surface of the middle rotating member 603. The middle permanent magnets 604 on the bottom surface of the middle rotating member 603 and the middle permanent magnets 604 on the top surface of the middle rotating member 603 are securely mounted by way of magnetic attraction of the multiple middle permanent magnets 604.

In one example, the magnetic pole of upper portions of each upper permanent magnet 602, each middle permanent magnet 604 and each lower permanent magnet 606 may be the magnetic north N pole, and the magnetic pole of lower portions of each upper permanent magnet 602, each middle permanent magnet 604 and each lower permanent magnet 606 may be the magnetic south S pole. In another example, the magnetic pole of upper portions of each upper permanent magnet 602, each middle permanent magnet 604 and each lower permanent magnet 606 may be the magnetic south S pole, and the magnetic pole of lower portions of each upper permanent magnet 602, each middle permanent magnet 604 and each lower permanent magnet 606 may be the magnetic north N pole.

The first fixing board 607 is securely mounted to the multiple struts 23 and is located between located between the bottom surface of the upper rotating member 601 and the top surface of the middle rotating member 603 and has multiple first slots 611 formed through the first fixing board 607 and aligned radially. Widths of each slot 611 progressively increase in a radial and outward direction of the first fixing board 607. The multiple first windings 608 are securely mounted inside the respective first slots 611 by tight-fit. A center line wound around by each first winding 608 is parallel to the center axis 21. An area distributed by each first winding 608 covers the upper permanent magnets 602 in a corresponding row of the multiple upper permanent magnets 602 and the middle permanent magnets 604 in a corresponding row of the multiple middle permanent magnets 604. A retaining member 612 may be mounted on each of a top surface and a bottom surface of the first fixing board 607 to cover the multiple first slots 611, thereby preventing the multiple first windings 608 from falling off the respective first slots 611.

The second fixing board 609 is securely mounted to the multiple struts 23 and is located between the top surface of the lower rotating member 605 and the bottom surface of the middle rotating member 603 and has multiple second slots 613 formed through the second fixing board 609 and aligned radially. As the second fixing board 609 and the first fixing board 607 are structurally similar and the second windings 610 and the first windings 608 are structurally similar, description of those elements are not elaborated here. An area distributed by each second winding 610 covers the lower permanent magnets 606 in a corresponding row of the multiple lower permanent magnets 606 and the middle permanent magnets 604 in a corresponding row of the multiple middle permanent magnets 604.

Figure 10:
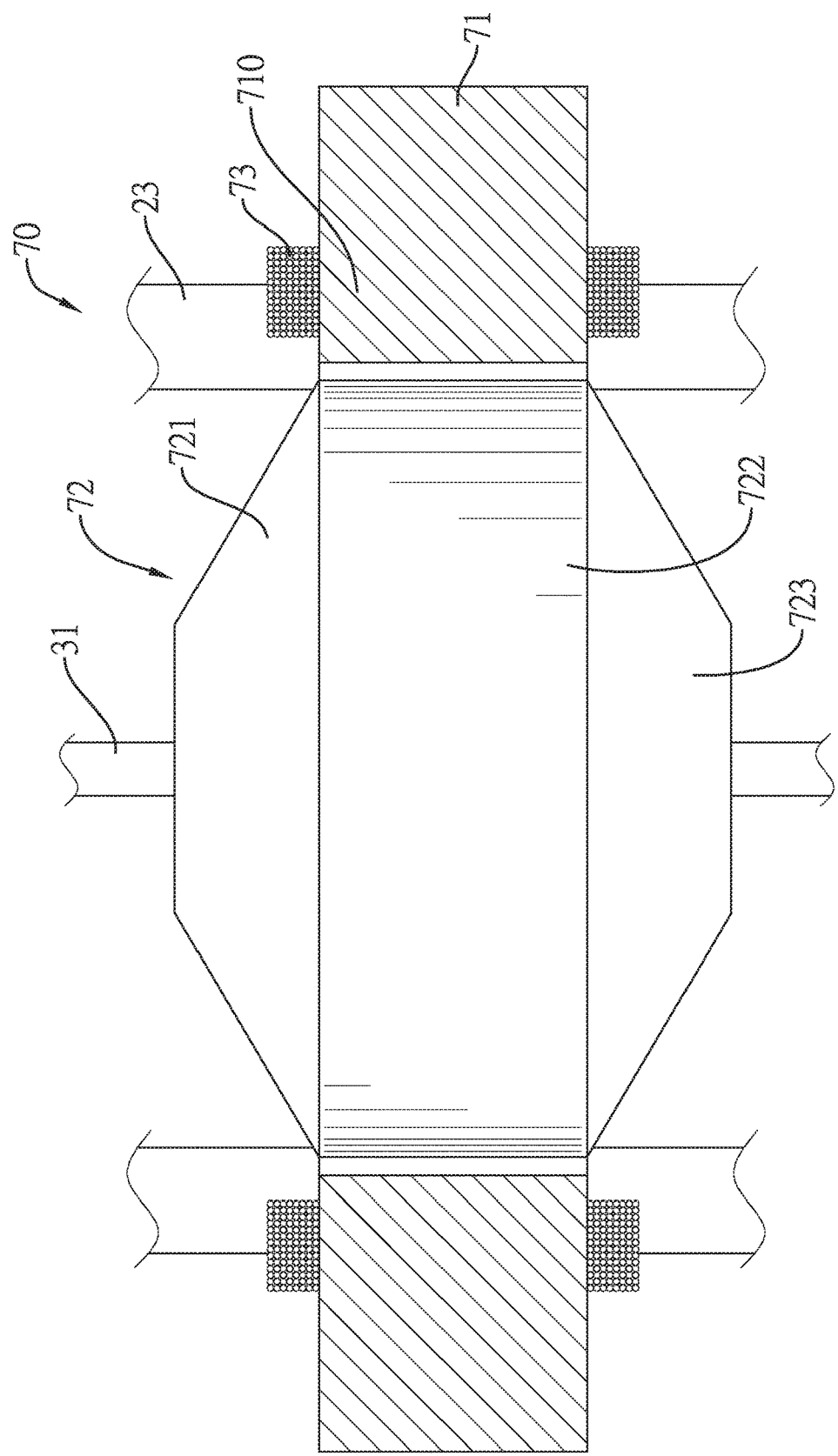
FIG. 10 is a cross-sectional view of a motor of the power generation apparatus in FIG. 7.
Figure 11:
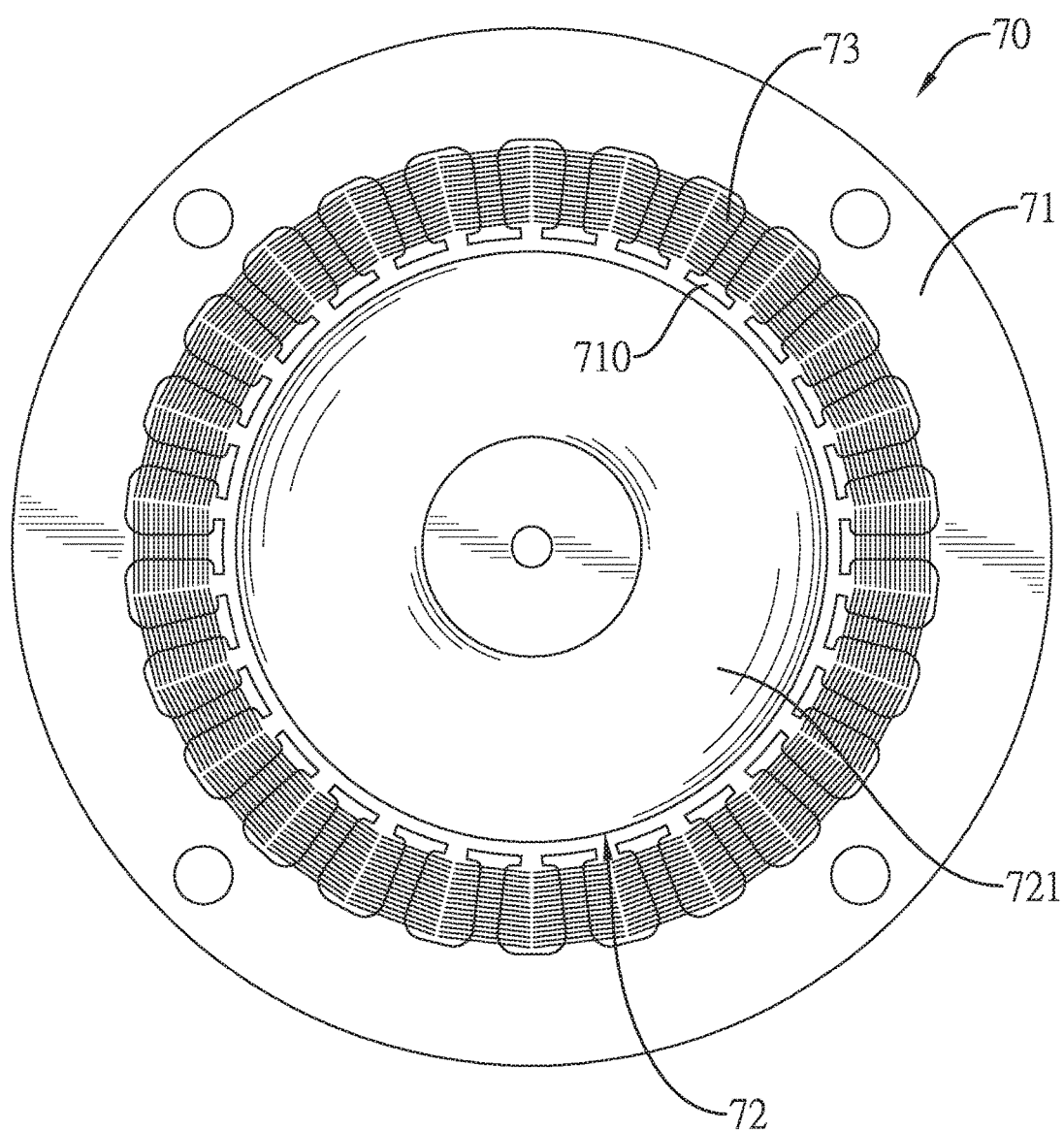
FIG. 11 is a bottom view of the motor in FIG. 10.

With reference to FIG. 1, the motor 70 and the power generator 60 are separately mounted. With reference to FIGS. 10 and 11, the motor 70 has a stator 71 and a rotor 72. The stator 71 is securely mounted to the multiple struts 23 and has multiple posts 710 annularly formed on an inner wall of the stator 71 and spaced apart from each other by a gap. A winding 73 is mounted around each post 710. The rotor 72 may be made of aluminum or iron, is mounted around the spindle 31, is located within the stator 71, and is rotated along with the spindle 31 with respect to the stator 71. A circumferential edge of the rotor 72 is spaced apart from the multiple posts 710 by a gap. The rotor 72 has a top block 721, a middle block 722 and a bottom block 723 integrally formed as a whole. The middle block 722 may be a cylindrical block. The top block 721 is formed on a top surface of the middle block 722 and tapers upwards. The bottom block 723 is formed on a bottom surface of the middle block 722 and tapers downwards. The diameters of a bottom surface of the top block 721, a top surface of the bottom block 723, and the middle block 722 are equal. The diameter of the middle block 722 may be larger than those of the upper rotating member 601, the middle rotating member 603 and the lower rotating member 605.

With further reference to FIGS. 1 and 3, when the power generation apparatus is operated, the motor 70 outputs rotational kinematic energy to the transmission mechanism 30, meaning that the magnetic field generated by the winding 73 inside the motor 70 drives the rotor 72 and the transmission mechanism 30 to rotate. As being subject to the magnetic force exerted by the multiple magnetic drive assemblies 40, the transmission mechanism 30 is vertically and suspendedly mounted inside the support frame 20 and is rotated around the center axis 21 of the support frame 20. To lower resistance when the transmission mechanism 30 is rotated, the power generation apparatus 10 can be mounted in a vacuum environment. When the included angle between the center axis 21 and each of the peripheral surface of the lower driven portion 322 of the transmission mechanism 30 and the included angle between the inner surface of each of the first magnetic drive member 41 and the second magnetic drive member 42 facing the corresponding magnetic driven member 32 and the center axis 21 is less than 45°, the transmission mechanism 30 is subject to a greater magnetic force in an upward direction, which is appropriate to the transmission mechanism 30 with a heavier weight and operation requiring that the transmission mechanism 30 is operated at a slower speed. On the other hand, when the included angle between the center axis 21 and each of the peripheral surface of the lower driven portion 322 of the transmission mechanism 30 and the included angle between the inner surface of each of the first magnetic drive member 41 and the second magnetic drive member 42 facing the corresponding magnetic driven member 32 and the center axis 21 are more than 45°, the transmission mechanism 30 is subject to a greater magnetic force in a radial direction, which is appropriate to the transmission mechanism 30 with a lighter weight and operation requiring that the transmission mechanism 30 is operated at a faster speed.

When the transmission mechanism 30 and the weight 50 mounted to a bottom end of the transmission mechanism 30 are driven and rotated to store electrical energy, the motor 70 stops outputting rotational kinematic energy until the transmission mechanism 30 and the weight 50 reach a specific rotation speed. The transmission mechanism 30 and the weight 50 can be still rotated by rotational inertia. In view of no friction loss between the support frame 20 and the transmission mechanism 30, the transmission mechanism 30 can be driven by a higher torque or at a higher rotation speed. With the tapering structure in the weight 50 and the rotor 72, the transmission mechanism 30 as a whole can be firmly rotated.

When the transmission mechanism 30 is rotated, the multiple upper permanent magnets 602, the multiple middle permanent magnets 604 and the multiple lower permanent magnets 606 are moved relative to the multiple first windings 608 and the multiple second windings 610, such that the multiple first windings 608 and the multiple second windings 610 cut through the magnetic lines of flux of the magnetic field to induce electric potential for power generation.

In sum, when the power generation apparatus 10 in accordance with the present invention is operated, the motor 70 is used to drive the transmission mechanism 30 and the weight 50 securely mounted to the bottom end of the transmission mechanism 30 to rotate for storing the generated electrical energy. As the multiple magnetic drive assemblies 40 apply an upward force of magnetic repulsion to the transmission mechanism 30, the weight of the rotational portions of the primary power generator 60 and the motor 70 can be offset. Moreover, since there is no friction between the rotating transmission mechanism 30 and the multiple magnetic drive assemblies 40, the rotor 72 of the motor 70 and the upper rotating member 601, the middle rotating member 603 and the lower rotating member 605 of the power generator 60 can be effectively enhanced with faster rotation speed to increase the induced current generated by the first windings 608 and the second windings 610 of the power generator 60. Thus, energy loss during the course of energy transmission can be reduced to achieve the energy-saving goal. The motor 70 stops outputting rotational kinematic energy until the transmission mechanism 30 and the weight 50 mounted to the bottom end of the transmission mechanism 30 reach a specific rotation speed, while the transmission mechanism 30 and the primary motor 50 can be still rotated by rotational inertia to continuously convert rotational kinematic energy into electrical energy for attaining the excellent effectiveness of power generation.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vertically mounted and magnetically driven power generation apparatus with energy-saving effect, comprising:
a magnetically driven transmission assembly having:
a support frame having:
multiple shelves vertically arranged and vertically spaced apart from each other, each shelf having a through hole formed through the shelf and tapering downwards;
multiple struts securely connected with the multiple shelves; and
a center axis vertically and centrally passing through the support frame and the through holes of the multiple shelves;
a transmission mechanism having:
a spindle vertically mounted through the support frame along the center axis; and
multiple magnetic driven members securely mounted around the spindle and located within the through holes of the respective shelves, each magnetic driven member being a permanent magnet and having:
an upper driven portion being a truncated cone tapering upwards, wherein a top of the upper driven portion extends beyond a top surface of a corresponding shelf through a top opening of the through hole of the corresponding shelf;
a lower driven portion with a top connected with a bottom of the upper driven portion, being a truncated cone tapering downwards, having a shape symmetrical to that of the upper driven portion, having a magnetic pole different from that of the upper driven portion, and mounted inside the through hole of the corresponding shelf; and
a ridge line formed on a junction between the upper driven portion and the lower driven portion and taking the form of a circle;
multiple magnetic drive assemblies mounted in inner walls of the through holes of the respective shelves, each magnetic drive assembly having:
a first magnetic drive member mounted in the inner wall of the through hole of a corresponding shelf; and
a second magnetic drive member with a top connected with a bottom of the first magnetic drive member, mounted in the inner wall of the through hole of the corresponding shelf, wherein the first magnetic drive member and the second magnetic drive member are adjacent to but have no contact with the lower driven portion of a corresponding magnetic driven member by way of mutual magnetic repulsion for the transmission mechanism to be vertically and suspendedly mounted through the support frame and the multiple magnetic drive assemblies; and
a weight securely mounted to a bottom end of the spindle of the transmission mechanism;
a power generator having:
an upper rotating member securely mounted around the spindle;
multiple upper permanent magnets mounted in a bottom surface of the upper rotating member and distributed in rows aligned in multiple radial directions on the upper rotating member, wherein bottom surfaces of the multiple upper permanent magnets are flush with the bottom surface of the upper rotating member;
a lower rotating member securely mounted around the spindle;
multiple lower permanent magnets mounted in a top surface of the lower rotating member and distributed in rows aligned in multiple radial directions on the lower rotating member, wherein top surfaces of the multiple lower permanent magnets are flush with the top surface of the lower rotating member;
a middle rotating member securely mounted around the spindle and located between the upper rotating member and the lower rotating member;
multiple middle permanent magnets mounted in a top surface and a bottom surface of the middle rotating member;
a first fixing board securely mounted to the multiple struts, located between the upper rotating member and the middle rotating member, and having multiple first slots formed through the first fixing board, aligned radially, and progressively increasing in width in a radial and outward direction of the first fixing board;
multiple first windings mounted inside the respective first slots of the first fixing board;
a second fixing board securely mounted to the multiple struts, located between the lower rotating member and the middle rotating member, and having multiple second slots formed through the second fixing board, aligned radially, and progressively increasing in width in a radial and outward direction of the second fixing board;
multiple second windings mounted inside the respective second slots of the second fixing board; and
a motor mounted around the spindle, separated from the power generator, and having:
a stator securely mounted to the multiple struts; and
a rotor mounted around the spindle and located within the stator.

2. The power generation apparatus as claimed in claim 1, wherein the rotor has a top block, a middle block and a bottom block integrally formed, the top block is formed on a top surface of the middle block and tapers upwards, and the bottom block is formed on a bottom surface of the middle block and tapers downwards.

3. The power generation apparatus as claimed in claim 2, wherein the middle block is a cylindrical block, diameters of a bottom surface of the top block, a top surface of the bottom block, and the middle block are equal, and the diameter of the middle block is larger than those of the upper rotating member, the middle rotating member and the lower rotating member.

4. The power generation apparatus as claimed in claim 3, wherein the upper rotating member of the power generator takes the form of a truncated cone, an included angle between a peripheral surface and a bottom surface of the upper rotating member of the power generator is 30°, the lower rotating member of the power generator takes the form of a truncated cone, and an included angle between a peripheral surface and a top surface of the lower rotating member is 30°.

5. The power generation apparatus as claimed in claim 1, wherein the multiple magnetic driven members include six magnetic driven members, and two of the six multiple magnetic driven members, the power generator, another two of the six magnetic driven members, the motor, the remaining two magnetic driven members, and the weight are sequentially mounted around the spindle in a downward direction and are spaced apart from each other.

6. The power generation apparatus as claimed in claim 4, wherein the multiple magnetic driven members include six magnetic driven members, and two of the six multiple magnetic driven members, the power generator, another two of the six magnetic driven members, the motor, the remaining two magnetic driven members, and the weight are sequentially mounted around the spindle in a downward direction and are spaced apart from each other.

7. The power generation apparatus as claimed in claim 5, wherein the weight has an upper portion and a lower portion, the upper portion is a truncated cone or a truncated pyramid tapering upwards, the lower portion is a truncated cone or a truncated pyramid tapering downwards, and the upper portion and the lower portion are symmetrical in shape.

8. The power generation apparatus as claimed in claim 6, wherein the weight has an upper portion and a lower portion, the upper portion is a truncated cone or a truncated pyramid tapering upwards, the lower portion is a truncated cone or a truncated pyramid tapering downwards, and the upper portion and the lower portion are symmetrical in shape.

9. The power generation apparatus as claimed in claim 7, wherein
   the multiple first windings are securely mounted inside the respective first slots of the first fixing board by tight-fit, a center line wound around by each first winding is parallel to the center axis, and an area distributed by each first winding covers the upper permanent magnets in a corresponding row of the multiple upper permanent magnets and the middle permanent magnets in a corresponding row of the multiple middle permanent magnets; and
   the multiple second windings are securely mounted inside the respective second slots of the second fixing board by tight-fit, a center line wound around by each second winding is parallel to the center axis, and an area distributed by each second winding covers the lower permanent magnets in a corresponding row of the multiple lower permanent magnets and the middle permanent magnets in a corresponding row of the multiple middle permanent magnets.

10. The power generation apparatus as claimed in claim 8, wherein
    the multiple first windings are securely mounted inside the respective first slots of the first fixing board by tight-fit, a center line wound around by each first winding is parallel to the center axis, and an area distributed by each first winding covers the upper permanent magnets in a corresponding row of the multiple upper permanent magnets and the middle permanent magnets in a corresponding row of the multiple middle permanent magnets; and
    the multiple second windings are securely mounted inside the respective second slots of the second fixing board by tight-fit, a center line wound around by each second winding is parallel to the center axis, and an area distributed by each second winding covers the lower permanent magnets in a corresponding row of the multiple lower permanent magnets and the middle permanent magnets in a corresponding row of the multiple middle permanent magnets.

11. The power generation apparatus as claimed in claim 9, wherein a retaining member is mounted on each of a top surface and a bottom surface of the first fixing board to cover the multiple first slots, and a retaining member is mounted on each of a top surface and a bottom surface of the second fixing board to cover the multiple second slots.

12. The power generation apparatus as claimed in claim 10, wherein a retaining member is mounted on each of a top surface and a bottom surface of the first fixing board to cover the multiple first slots, and a retaining member is mounted on each of a top surface and a bottom surface of the second fixing board to cover the multiple second slots.

13. The power generation apparatus as claimed in claim 11, wherein
    an included angle between the center axis and a peripheral surface of each of the lower driven portion and the upper driven portion of each magnetic driven member is in a range of 15° to 75°;
    each first magnetic drive member has multiple first permanent magnets annularly mounted around the inner wall of the through hole of a corresponding shelf and spaced apart from each other, and each first permanent magnet includes an upper pole portion and a lower pole portion, the upper pole portion and the lower pole portion are integrally formed and annularly mounted in the inner wall of the through hole to face a corresponding magnetic driven member, the upper pole portion and the lower pole portion are spaced apart from the lower driven portion of the corresponding magnetic driven member by a gap, the upper pole portion and the lower driven portion of the corresponding magnetic driven member have different magnetic poles, and the lower pole portion and the lower driven portion of the corresponding magnetic driven member have identical magnetic poles; and
    each second magnetic drive member has multiple second permanent magnets annularly mounted in the inner wall of the through hole of the corresponding shelf and spaced apart from each other, each second permanent magnet has an inner pole portion proximate to the center axis and an outer pole portion distal to the center axis, the inner pole portion and the outer pole portion are integrally formed and are spaced apart from the lower driven portion of the corresponding magnetic driven member by a gap, and the inner pole portion and the lower driven portion of the corresponding magnetic driven member have an identical magnetic pole.

14. The power generation apparatus as claimed in claim 12, wherein
    an included angle between the center axis and a peripheral surface of each of the lower driven portion and the upper driven portion of each magnetic driven member is in a range of 15° to 75°;
    each first magnetic drive member has multiple first permanent magnets annularly mounted around the inner wall of the through hole of a corresponding shelf and spaced apart from each other, and each first permanent magnet includes an upper pole portion and a lower pole portion, the upper pole portion and the lower pole portion are integrally formed and annularly mounted in the inner wall of the through hole to face a corresponding magnetic driven member, the upper pole portion and the lower pole portion are spaced apart from the lower driven portion of the corresponding magnetic driven member by a gap, the upper pole portion and the lower driven portion of the corresponding magnetic driven member have different magnetic poles, and the lower pole portion and the lower driven portion of the corresponding magnetic driven member have identical magnetic poles; and each second magnetic drive member has multiple second permanent magnets annularly mounted in the inner wall of the through hole of the corresponding shelf and spaced apart from each other, each second permanent magnet has an inner pole portion proximate to the center axis and an outer pole portion distal to the center axis, the inner pole portion and the outer pole portion are integrally formed and are spaced apart from the lower driven portion of t h e corresponding magnetic driven member by a gap, and the inner pole portion and the lower driven portion of the corresponding magnetic driven member have an identical magnetic pole.

15. The power generation apparatus as claimed in claim 11, wherein
each of the first permanent magnet and the second permanent magnet takes the form of a straight bar or a truncated sector plate; and
the inner surface of each of the first permanent magnet and the second permanent magnet facing a corresponding magnetic driven member is a flat surface or a curved surface.

16. The power generation apparatus as claimed in claim 12, wherein
each of the first permanent magnet and the second permanent magnet takes the form of a straight bar or a truncated sector plate; and
the inner surface of each of the first permanent magnet and the second permanent magnet facing a corresponding magnetic driven member is a flat surface or a curved surface.

* * * * *